US007860941B1

(12) United States Patent
Wilson

(10) Patent No.: US 7,860,941 B1
(45) Date of Patent: Dec. 28, 2010

(54) INFINIBAND LAYER 4 ROUTER AND METHODS FOR IMPLEMENTING SAME IN AN INFINIBAND BASED EXTERNAL STORAGE DEVICE

(75) Inventor: Andrew W. Wilson, Fremont, CA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 3016 days.

(21) Appl. No.: 10/198,337

(22) Filed: Jul. 17, 2002

Related U.S. Application Data

(60) Provisional application No. 60/306,329, filed on Jul. 17, 2001.

(51) Int. Cl.
G06F 15/16 (2006.01)
(52) U.S. Cl. ..................................... 709/217
(58) Field of Classification Search .......... 709/217–219
See application file for complete search history.

(56) References Cited

U.S. PATENT DOCUMENTS 6,594,712 B1 * 7/2003 Pettey et al. .................. 710/22
6,704,831 B1 * 3/2004 Avery .......................... 710/310
6,990,528 B1 * 1/2006 Neal et al. .................... 709/232
7,000,025 B1 * 2/2006 Wilson ......................... 709/235
7,155,537 B1 * 12/2006 Weber et al. ................. 709/249
7,711,793 B1 * 5/2010 Wilson ......................... 709/217

* cited by examiner

Primary Examiner—Wing F Chan
Assistant Examiner—Alicia Baturay
(74) Attorney, Agent, or Firm—Martine Penilla & Gencarella, LLP

(57) ABSTRACT

In one of many embodiments, an InfiniBand network architecture is provided where a router circuitry communicates data between a host and a target device where the router circuitry includes circuitry for generating an external queue pair (QP) for establishing communication between the router circuitry and the host through a reliable connection (RC) session. The router circuitry also includes circuitry for generating internal queue pairs where the internal queue pairs establishes communication between the router circuitry and a device controller, between the between the device controller and the target device, and between the router circuitry and the target device by using reliable connection (RC) sessions. The router circuitry also includes mapping circuitry capable of establishing data destinations in communications between the target and the host. The internal queue pairs are coupled with the external queue pair through the mapping circuitry.

41 Claims, 11 Drawing Sheets

INFINIBAND LAYER 4 ROUTER AND METHODS FOR IMPLEMENTING SAME IN AN INFINIBAND BASED EXTERNAL STORAGE DEVICE

CROSS REFERENCE TO RELATED APPLICATION

This is a non-provisional application claiming priority from a U.S. Provisional Application No. 60/306,329 entitled "INFINIBAND ROUTER AND METHODS FOR IMPLEMENTING SAME IN AN INFINIBAND BASED EXTERNAL STORAGE DEVICE", filed on Jul. 17, 2001. The aforementioned provisional application is hereby incorporated by reference.

BACKGROUND OF THE INVENTION

1. Field of the Invention

This invention relates generally to the field of computing technology and more particularly concerns optimization of InfiniBand™ architecture.

2. Description of the Related Art

Most external storage box designs use one or more industry standard peripheral component interconnect (PCI) busses internally to connect between the redundant array of inexpensive disks (RAID) processor, disk drive interconnect initiators, and storage area network (SAN) interfaces, even those which are connected to InfiniBand SANs. However, PCI busses are becoming bottlenecks in external storage box designs.

Current external storage controller designs generally use one or more PCI busses to connect SAN interfaces to controller memory and processors and connect the memory and processors to storage interfaces. The bridge and memory configurations vary from design to design, but FIG. 1 shows an example of such a configuration.

FIG. 1 illustrates a conventional external storage architecture 10. The storage architecture includes hosts 12 and 16 connected to an InfiniBand-PCI (IB-PCI) target channel adapter (TCA) 18 through an InfiniBand fabric 14. The InfiniBand-PCI TCA 18 is connected to a bridge 22 which is in turn connected to a RAID processor 20, memory 24 and SATA host adapters (HA) 30 and 32. From an InfiniBand perspective, it requires one queue pair (QP) per host process, with the RAID processor 20 sending and receiving all SCSI RDMA Protocol (SRP) or (direct access file system) DAFS messages and generating remote direct memory access protocol (RDMA) operations to transfer data to and from the hosts. A queue pair is an endpoint of a link between communicating entities where communication is achieved through direct memory-to-memory transfers between applications and devices. Within the external RAID box all data is transferred by PCI DMA operations and control information by PCI DMA and PCI PIO.

There are numerous disadvantages to this approach, which will become more significant over time. The approach requires that all data pass through the memory block, which doubles memory bandwidth requirements and increases latency. At present, the memory pass through approach is the only option and as data throughput in other parts of the system increase, memory pass through blockage will probably become an increased bottleneck. An additional problem is the bandwidth limitations of parallel, shared busses, such as PCI which can be overloaded with data and therefore decrease data transmission throughput and efficiency. Therefore, as time progresses and data throughput needs becomes greater, the prior art data transmission architecture will generally not have enough capabilities to enable optimal data transmission.

To try to improve scalability and performance, a data transmission system like an InfinaBand™ approach may be used. Prior art InfiniBand networks could be used to improve performance and scalability but performance between host and target is typically not optimum. Switched data may be utilized however there are still scalability concerns.

Typical InfiniBand architecture information may be found in a document called "InfiniBand architecture specification" volume 1 release 1.0.a published by InfiniBand Trade Association[SM] dated Jun. 19, 2001. This document is hereby incorporated by reference.

Therefore, there is a need for a router that is capable of enabling InfiniBand communications which uses RDMA read and write operations to remove PCI bottlenecks and enable direct RDMA communication between a device to a host to optimize data transmission between hosts and targets connected over a network.

SUMMARY OF THE INVENTION

Broadly speaking, the present invention fills these needs by providing a layer 4 router for optimizing InfiniBand data transmission system architecture. It should be appreciated that the present invention can be implemented in numerous ways, including as a process, an apparatus, a system, a device, or a method. Several inventive embodiments of the present invention are described below.

In one embodiment, an InfiniBand network architecture is provided where a router circuitry communicates data between a host and a target device where the router circuitry includes circuitry for generating an external queue pair (QP) for establishing communication between the router circuitry and the host through a reliable connection (RC) session. The router circuitry also includes circuitry for generating internal queue pairs where the internal queue pairs establishes communication between the router circuitry and a device controller, between the between the device controller and the target device, and between the router circuitry and the target device by using reliable connection (RC) sessions. The router circuitry also includes mapping circuitry capable of establishing data destinations in communications between the target and the host. The internal queue pairs are coupled with the external queue pair through the mapping circuitry.

In another embodiment, an InfiniBand network architecture includes router circuitry configured to communicate data between a host and a target device. The router circuitry generates an external queue pair (QP) for establishing communication between the router circuitry and the host through a reliable connection (RC) session. The router circuitry also generates internal queue pairs where one of the internal queue pairs is coupled with the external queue pair. The internal queue pairs establishes communications between a device controller and the target device, between the router circuitry and the device controller, and between the router circuitry and the target device by using reliable datagram (RD) sessions. The router circuitry also generates a router end-to-end context for enabling the internal queue pairs to communicate with at least one controller end-to-end context and at least one target device end-to-end context.

In yet another embodiment, an InfiniBand network architecture is provided which includes router circuitry configured to communicate data between a host and a target device. The router circuitry includes circuitry for generating an external queue pair (QP) for establishing communication between the router circuitry and the host through a reliable connection (RC) session. The router circuitry also includes circuitry for generating internal queue pairs. A first set of the internal queue pairs establishes communication between the router circuitry and a device controller by using reliable datagram (RD) sessions, and a second set of internal queue pairs establishes communications between the router circuitry and the target device by using reliable connection (RC) sessions. The router circuitry also includes circuitry for generating a router end-to-end context for enabling the internal queue pairs to communicate with at least one controller end-to-end context. The router circuitry further generates a mapping unit that establishes data destinations in communications between the target and the host so that one of the second set of internal queue pairs are coupled with the external queue pair through the mapping unit.

In another embodiment, an InfiniBand network architecture is provided which includes a plurality of hosts, a plurality of targets, a controller for managing communication with the plurality of targets, an InfiniBand switch, and a router configured to communicate data between the plurality of hosts and the plurality of target devices over the InfiniBand switch. The router facilitates remote direct memory access (RDMA) communications between the plurality of targets and the plurality of hosts while bypassing a device controller, and the router uses information at a transport layer to route data between transport sessions.

In yet another embodiment, an InfiniBand network architecture is provided which includes a router circuitry configured to communicate data between a host and a target device. The router circuitry includes circuitry for generating an external queue pair (QP) for establishing communication between the router circuitry and the host through a reliable connection (RC) session. The router circuitry also includes circuitry for generating internal queue pairs where one of the internal queue pairs is coupled with the external queue pair. The internal queue pairs establish communications between a device controller and the target device, between the router circuitry and the device controller, and between the router circuitry and the target device by using reliable datagram (RD) sessions. The router circuitry further includes circuitry for generating a router end-to-end context for enabling the internal queue pairs to communicate with at least one controller end-to-end context and at least one target device end-to-end context.

In yet another embodiment, a computer readable media having program instructions for implementing data transmission over an InfiniBand network architecture where a router communicates data between a host and a target is provided. The computer readable media includes program instructions for generating an external queue pair (QP) for establishing communication between the router and the host through a reliable connection (RC) session. The computer readable media also includes program instructions for generating internal queue pairs where a first set of the internal queue pairs establishes communication between the router and a device controller by using reliable datagram (RD) sessions, and a second set of internal queue pairs establishes communications between the router and the target device by using reliable connection (RC) sessions. The computer readable media further includes program instructions for generating a router end-to-end context for enabling the internal queue pairs to communicate with at least one controller end-to-end context. The computer readable media also includes program instructions for mapping data destinations for communications between the target and the host, such that one of the second set of internal queue pairs is coupled with the external queue pair through the mapping unit.

In another embodiment, a computer readable media having program instructions for implementing data transmission over an InfiniBand network architecture where a router communicates data between a host and a target is disclosed. The computer readable media includes program instructions for generating an external queue pair (QP) for establishing communication between the router and the host through a reliable connection (RC) session. The computer readable media also includes program instructions for generating internal queue pairs where the internal queue pairs establish communication between the router and a device controller, between the between the device controller and the target device, and between the router and the target device by using reliable connection (RC) sessions. The computer readable media further includes program instructions for mapping data destinations for communications between the target and the host. One of the internal queue pairs is coupled with the external queue pair by the mapping.

In yet another embodiment, a computer readable media having program instructions for implementing data transmission over an InfiniBand network architecture where a router communicates data between a host and a target is provided. The computer readable media includes program instructions for generating an external queue pair (QP) for establishing communication between the router and the host through a reliable connection (RC) session. The computer readable media also includes program instructions for generating internal queue pairs where one of the internal queue pairs is coupled with the external queue pair. The internal queue pairs establishes communications between a device controller and the target device, between the router and the device controller, and between the router and the target device by using reliable datagram (RD) sessions. The computer readable media further includes program instructions for generating a router end-to-end context for enabling the internal queue pairs to communicate with at least one controller end-to-end context and at least one target device end-to-end context.

The advantages of the present invention are numerous. The present invention utilizes an intelligent and powerful InfiniBand architectures to enable significant increases in data transfer efficiencies. Specifically, the present invention can utilize different router architectural configurations to control queue pair explosions (as explained below) and to enable direct RDMA communications between target channel adapters and hosts while bypassing devices such as, for example, a RAID controller thereby removing a potential bottleneck of data transmission. By doing this, the present invention has the potent ability to both reduce congestion in a transmission media and also to take full advantage of the transmission capabilities of an InfiniBand based system. Therefore, the present invention may be used to optimize data transmission to and from storage devices connected over an InfiniBand network to increase data transmission efficacy.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

An invention is described for optimizing InfiniBand based systems by usage of a layer four router to optimize data transmission. It will be obvious, however, to one skilled in the art, that the present invention may be practiced without some or all of these specific details. In other instances, well known process operations have not been described in detail in order not to unnecessarily obscure the present invention.

Most external storage box designs typically use one or more industry standard PCI busses internally to connect between the RAID processor, disk drive interconnect initiators, SAN interfaces, and even those which are connected to InfiniBand SANs. However, PCI busses (which in this document will be used to refer to all versions of PCI, including PCI-X) may be bottlenecks in external storage box designs. As utilized herein, InfiniBand can optimally serve as a PCI bus replacement to enable enhanced data throughput. Therefore, as utilized in the router described herein, InfiniBand can serve as both a PCI bus replacement and a next generation SAN, enabling the design of a flexible, very high performance external storage architecture.

With an InfiniBand system, the data traffic between the external storage unit and the hosts is transferred over the Reliable Connected (RC) transport service. Both SCSI RDMA Protocol (SRP) and Direct Access File System (DAFS) map similarly to IB RC, with IB Message SENDs used by hosts to deliver I/O requests to the controller, and IB Message SENDs used by the controller to return I/O status to the hosts. If using SRP the controller may be a RAID controller, and if using DAFS the controller may be a file system controller which may include file system functionality as well as RAID functionality. The actual data transfer is done using RDMA Writes from the storage unit for data reads, and RDMA Reads from the storage unit for data writes.

Figure 1:
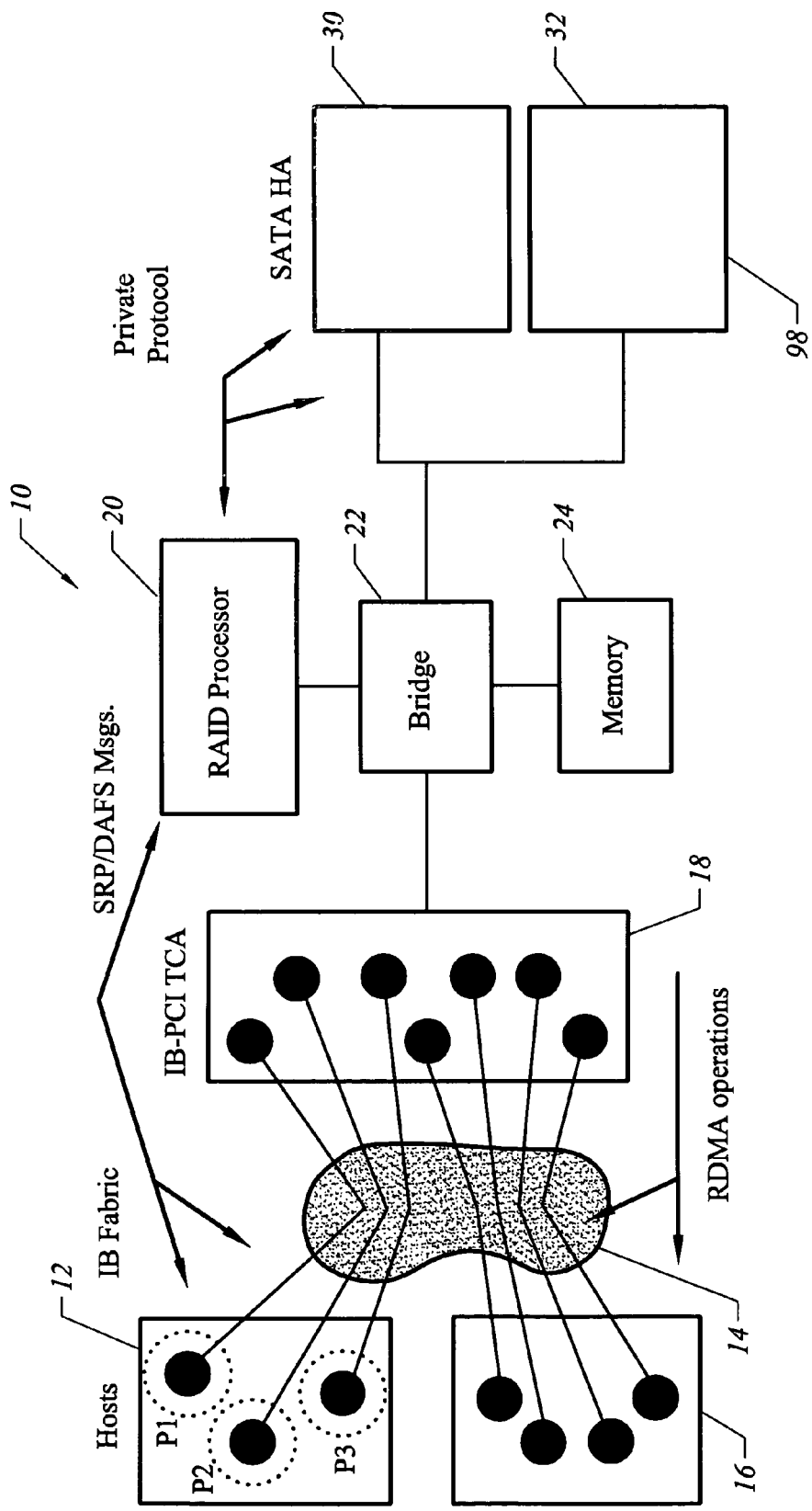
FIG. 1 illustrates a conventional external storage architecture.
Figure 2:
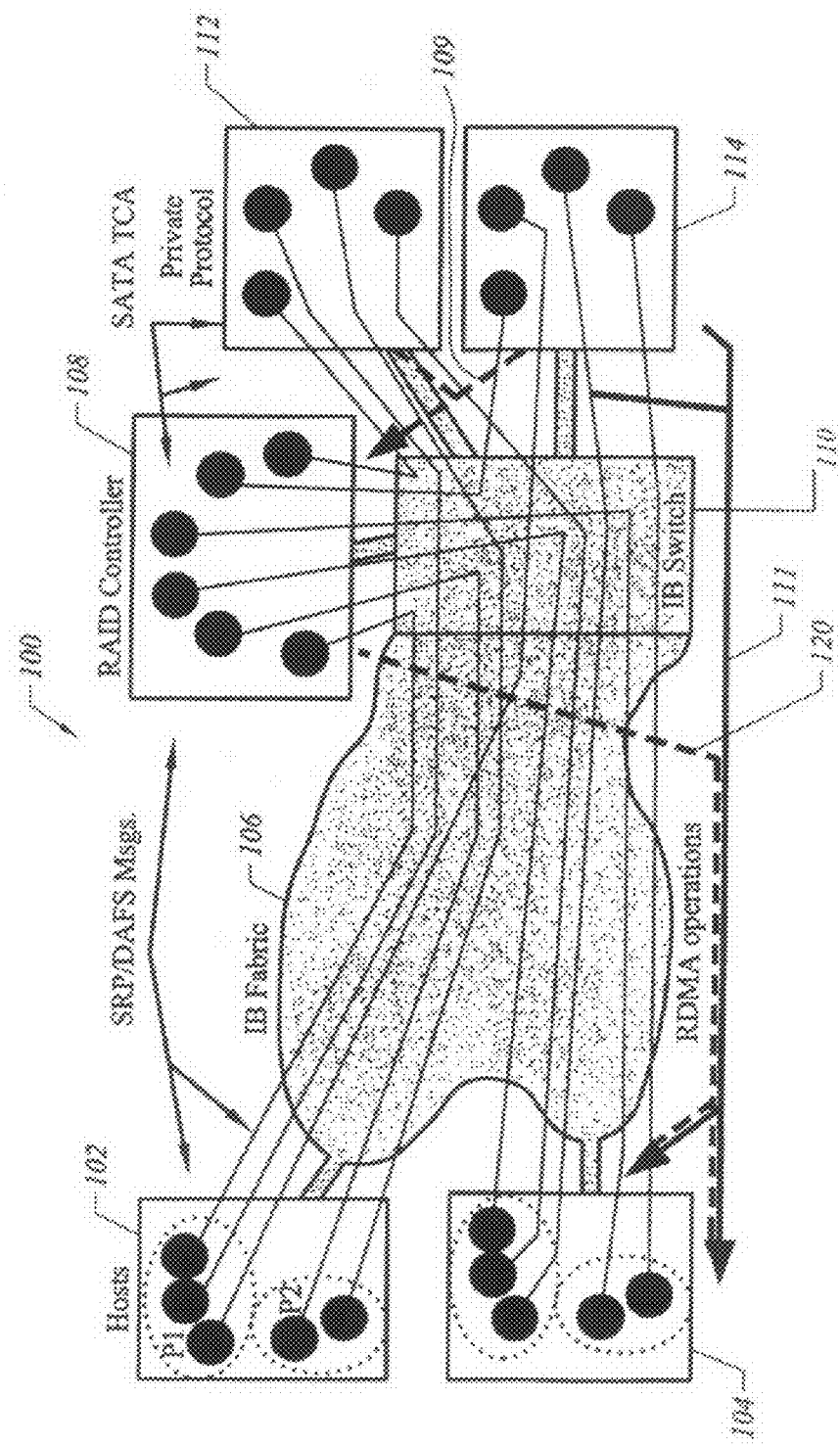
FIG. 2 illustrates an InfiniBand data transmission system showing a direct InfiniBand based approach in accordance with one embodiment of the present invention.

FIG. 2 illustrates an InfiniBand data transmission system 100 showing a direct InfiniBand based approach in accordance with one embodiment of the present invention. In this embodiment, the InfiniBand data transmission system 100 includes hosts 102 and 104 that communicate with a RAID controller 108 through an IB fabric 106 and an IB switch 110. The RAID controller 108 communicates with serial AT bus attachment (SATA) TCA's 112 and 114 through the IB switch 110. In one embodiment, the IB switch 110, RAID controller 108, and the TCA's 112 and 114 are located inside a storage box. The storage box may contain any suitable type of storage devices such as for example, disk drives, RAID, etc.

A couple of links from the IB fabric 106 are brought inside the box and connected to an internal IB switch 110. The switch 110 in turn connects to disk drive cable (SATA or SCSI) TCAs 112 and 114 in place of the PCI to disk drive cable host adapters (HAs), and to a RAID controller card 108. Initially the RAID controller 108 may have a PCI bus internally, connecting a RAID processor to the InfiniBand Fabric through an HCA or two. The card may also contain memory for Caching or Raid 5 processing. Since the disk cables are directly connected to InfiniBand, they can send and receive data from the hosts without going through the RAID controller's memory and PCI busses, increasing the system scalability enormously.

In one exemplary use of the architecture 100 described herein, a RAID 5 write and a read operation may be conducted. In both cases, the request, whether block or file, is sent as an InfiniBand message from a host to the RAID controller. The controller parses the request, then determine what disk operations are necessary to fulfill it. If it is a RAID 5 write, the controller usually has to bring the data into its own local memory through an RDMA read, as indicated by a dashed RDMA operation line 120 from the controller to the hosts. It then sends appropriate disk read and write operations through its own private protocol to the TCAs 112 and 114, which then uses RDMA operations to transfer data between themselves and the RAID controller's local memory as shown by line 109. Finally, the controller 108 sends a status message to the host over InfiniBand to complete the operation.

An additional benefit comes when the request does not require access to the controller's internal memory. In such a case the controller 108 can use its private protocol to notify the TCAs to do the appropriate disk operations but give them the information they need to do RDMA directly to the host machines. In one embodiment, a typical read request sends its data back to the host over solid RDMA operation lines 111, completely bypassing the RAID controller 108. When each of the TCA's 112 and 114 was finished, it may use the private protocol to notify the controller 108, and the controller 108 in turn notifies the host 102 through an InfiniBand SEND when all TCAs 112 and 114 were finished.

This approach has many advantages from a bandwidth scaling perspective, but the switch becomes part of the overall fabric which may lead to more visibility of the internal workings of the box than might be desirable, especially from a security issue point of view. In addition, it depends on proposed extensions both SRP and DAFS to allow grouping of several RC sessions into one logical SRP connection. But the biggest issue is the need for large numbers of QPs due to the large number of Reliable Connected (RC) sessions required. If IB is used to its full advantage, where each process on each host communicates directly with the InfiniBand Fabric (rather than going though an intermediate host operating system service), the number of RC sessions needed would grow as the product of the number of processes per host times the number of hosts times the number of TCAs and RAID controllers per storage box times number of storage boxes. This is potentially a very large number.

One way to reduce this explosion of QPs is to use Reliable Datagram (RD) service instead of RC, but RD is limited to one message at a time per EEC pair, which could pose a significant performance issue in a computer room wide InfiniBand network. This suggests that using RC to connect between the storage box and each host process while using separate RC or RD services within the box may be optimal. To do that, some form of InfiniBand (IB) transport level (i.e. IB layer 4) routing is needed.

The InfiniBand Layer 4 (IB L4) router, also known as level 4 router (transport level), as described below in reference to FIGS. 3 through 11 avoids the problems of an explosion in Queue pairs (QP) required of the InfiniBand Target Channel Adapters (TCA), especially when direct target to host processes data transfer is allowed. By routing between different transport sessions, a significant reduction in total sessions can be achieved without sacrificing performance or many-to-many connectivity. It should be appreciated that the layer 4 router described herein can be utilized to optimize any suitable type of communications such as, for example, RDMA over IP, RDMA over Fibrechannel, etc.

Figure 3:
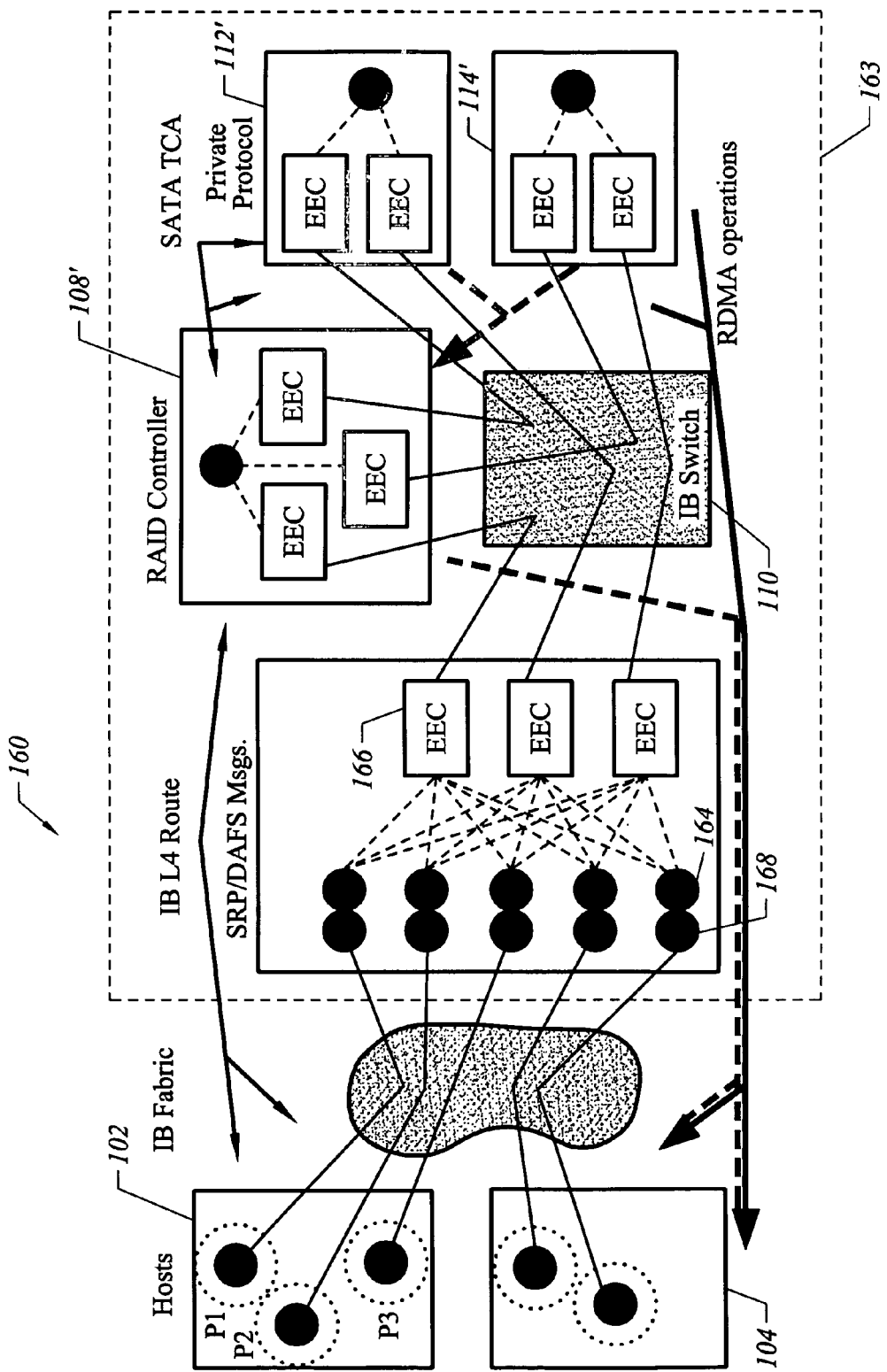
FIG. 3 shows an InfiniBand data transmission system illustrating an architecture with a layer 4 router using internal RD delivery in accordance with one embodiment of the present invention.

FIG. 3 shows an InfiniBand data transmission system 160 illustrating an architecture with a layer 4 router 162 using internal RD delivery in accordance with one embodiment of the present invention. The layer 4 router 162 is generally defined as one which uses information at the transport layer to route information between transport sessions. In an exemplary embodiment, the data transmission system 160 includes hosts 102 and 104 connected to the InfiniBand (IB) layer 4 (L4) router 162 through the IB fabric 106. It should be understood that any suitable number of hosts may be connected to the L4 router even though a limited number of hosts are shown and described in FIGS. 3 through 11 for exemplary reasons. The L4 router 162 includes a plurality of queue pairs (QP) communicating with a plurality of end to end contexts (EEC's) 166. The number of queue pairs in the system 160 (as well as other systems described in reference to FIGS. 3 through 11) may vary depending on the complexity of the L4 router and the number of connections needed to properly transport data in accordance with the present invention. The L4 router 162 is capable of communicating with a RAID controller 108' through the IB switch 110. It should be appreciated that the RAID controller as shown and described in FIGS. 3 through 11 are shown as an example and other suitable type of microprocessor that are configured to control any suitable peripheral devices may be utilized. Therefore, the L4 router as described herein may enable communications between any suitable types of hardware. In one embodiment, the RAID controller 108' can also communicate with SATA TCA's 112' and 114' through the IB switch 110. Any suitable number or types of hardware that enables communication with target devices may be used although in the embodiments described herein TCA's for disk drives are utilized.

It should be appreciated that the transport sessions need not be the same type of transport. For instance, a layer 4 network router might use port information from TCP (a transport layer protocol) to move information contained in the TCP packet to a particular ATM session. In one embodiment, QP number and/or RDMA address information may be used to route between RC sessions and optionally RD sessions. An embodiment as shown in reference to FIG. 3 uses both RD and RC sessions, and involves routing functions, while an alternative approach as described in reference to FIG. 4 removes the role of RD, while requiring a more complicated routing function. In yet another embodiment, FIG. 5 shows another approach which does not use any RD sessions but reduces the likelihood of QP explosions.

It should be appreciated that the router 162 (and other alternative embodiments of the router 162) may be any suitable type of hardware that may direct data as described herein such as, for example, a chip, a circuitry, etc.

In one embodiment as shown in FIG. 3, to avoid the QP explosion that results from the basic InfiniBand based approach, the InfiniBand Layer 4 router 162 may be used to transfer messages and RDMA requests between external RC sessions and internal RD sessions. Since the short latencies found within an external storage box should mitigate the performance issues of RD, it can be used within the box to allow full connectivity without an explosion of RC sessions and their associated QPs. Between the box and hosts on the fabric, use of RC enables full throughput with a reasonable number of RC sessions. In this embodiment, an RC to RD translation unit is used, which is conducted by the L4 router 162.

The router architecture indicates the basic communication paths and system components of the proposed architecture. Processes within host computers communicate with a storage box 163 over InfiniBand RC sessions. The QP's that communicate with devices outside of the storage box 163 may be known as external QP's, and QP's that communicate with devices inside of the storage box 163 may be known as internal QP's. In one embodiment the storage box 163 includes the router 162, the IB switch 110, the RAID controller 108', the TCA's 112' and 114' as well as the disk drives controlled by the TCA's 112' and 114'. The RC sessions from the host computers terminate in the L4 router 162 of the storage box 163, where the RC's QP's 168 are tightly coupled to RD QP's 164. The RD QP's in turn use a plurality of End to End Contexts (EEC) 166 to communicate with RD QPs on other internal components of the storage box 163, specifically the RAID controller 108' and the disk cable interface TCAs 112' and 114'. Since RD QPs can send messages through multiple EECs, and EECs can send messages to multiple RD QPs, full connectivity is achieved with a minimal number of reliable connections and QPs.

Determining the destination QPs for messages within the router may be accomplished as described below. All I/O request SENDs from hosts are routed to the RD QP in the controller over the router to a controller EEC session. The source QP number of the router's RD QP indicates to the controller which associated RC QP and hence which host RC session originated the request. The I/O status SENDs from controller to hosts are sent to the associated RD QP for the appropriate host RC session, thus directing them to the correct host. The RDMA requests are also sent to the RD QP associated with the desired router to host RC session's QP. Thus, RDMA write request and data routing and RDMA read request routing can be handled by the associated QP technique. In one embodiment, to route RDMA read response data back to the ultimate destination QP in the controller or TCA utilizes a method of associating the returning packets with the original request. This can be done by saving the expected Packet Sequence Numbers (PSN) of the response or acknowledgement packets along with routing information.

To further illustrate the operation of the L4 router and the storage box 163, three SCSI RDMA Protocol (SRP) requests are described. SRP is a protocol that enables transmission of SCSI commands across an InfiniBand network. SRP uses RDMA transfers to transmit SCSI data so throughput is enhanced and latencies are minimized.

In one embodiment, a host process sends an SRP request as an InfiniBand message to the storage box 163, where it is delivered to one of the RC QPs 168 in the L4 router. The RC QP passes the message to its associated RD QP 164 for forwarding to the RAID controller. In the case of a RAID 5 write, after receiving the write request from the host process, the RAID controller 108' determines the initial disk reads needed for parity generation, sending them to the TCAs 112' and 114' with instructions to direct their RDMAs to the controller's cache memory. At substantially the same time, the controller 108' issues its own RDMA read request to the host processes associated RD QP to fetch the data that is to be written into the controllers cache. The appropriate exclusive OR operations are performed, then the controller 108' issues disk write operations to the TCAs 112' and 114', again instructing them to fetch the modified data from the controller's cache through RDMA reads. When the writes are finished, the TCAs 112' and 114' notify the controller, which in turn sends an SRP completion and status message to the host process.

In one exemplary embodiment of a write operation, the SRP write request results in the controller 108' sending one or more write requests to TCAs 112' and 114', which informs them to fetch the data for those blocks directly from the host via RDMA through the router 162 to the TCAs 112' and 114'. The TCAs 112' and 114' do RD service RDMA reads to the router's associated QP of the RC session which connects the controller 108' to the host 102 (if the host 102 is initiating the write operation). The RDMA read is forwarded on to the RC session to the host 102. As each data packet of the RDMA read response arrives at the router 162, it is forwarded to the RD service QP in of the TCA's 112' and 114' which originated the request. RDMA read responses from several hosts could arrive for the same QP simultaneously. The packets from these RDMAs cannot be interleaved without violating the RD protocol, so the coupled RD-RC QPs functions as a transport level message switch, blocking other RDMA responses from other RCs until a given RDMA response is fully transferred to the RD QP.

When each of the TCA's 112' and 114' (if data is to be written to the disks controlled by the TCA's 112' and 114') has completed its RDMA read(s) (or optionally disk writes) for a given request, it sends a completion and status message back to the controller 108'. When the controller 108' receives completion messages from all of the TCAs 112' and 114' involved in a host request, it sends an SRP status message back to the host process.

In one exemplary embodiment of a read operation, the SRP read request results in the controller 108' sending one or more read requests to TCAs 112' and 114', which informs them to read selected blocks and send those blocks directly back (via RDMA through the router) to the host QP. As data streams into each TCA from the selected disk drives, it will be sent to the appropriate router RD QP using RDMA writes. The selected QP will be the one associated with the RC QP of the host process' RC session. The RDMA write will be forwarded on to the RC session. Note that RDMA writes from several TCAs could arrive for the same QP simultaneously. Similarly to RDMA read responses, the packets from these RDMAs cannot be interleaved without violating the RC protocol, so the coupled RD-RC QPs will have to function as a transport level message switch, blocking other RDMA requests and messages from other EECs until a given RDMA or message is fully transferred to the RC QP.

When each of the TCA's 112' and 114' has completed its RDMA (s) for a given request, it sends a completion and status message back to the controller 108'. When the controller 108' receives completion messages from all TCAs 112' and 114' involved in a host request, it sends an SRP status message back to the host process. The RDMAs may still be in progress on the RC session, but all have been queued up ahead of the status message, so the host process does not "see" the completion message until RDMAs have written the data to the host memory.

If the external storage box 163 is being accessed at the file level through DAFS, operation is similar to that described above, except that the controller 108' also performs file system functions as well as the RAID functions. In such a scenario, it may be useful for the RAID controller 108' to have a much larger cache, and have disk read data sent to it as well as to the L4 router 162. In one embodiment, two separate RDMA writes are employed, one to the L4 router 162 and one to the controller 108'. It should be appreciated that any other suitable type of communication may be employed for the purpose of sending data to both the L4 router and one to the controller 108' such as, for example, an InfiniBand multicast.

It is envisioned that the companion QPs may actually be able to share some resources, since they are permanently coupled together. Also, while the figure shows only one EEC connection between each IB device, more can be added to improve throughput by increasing the number of concurrent RDMA requests per device. This may be especially important for disk writes, which turn into RDMA reads. Disk reads, which turn into RDMA writes can be pipelined through the router and the RC session, improving their performance. Various methods are known for allocating requests to EECs that will produce good performance on average.

Figure 4:
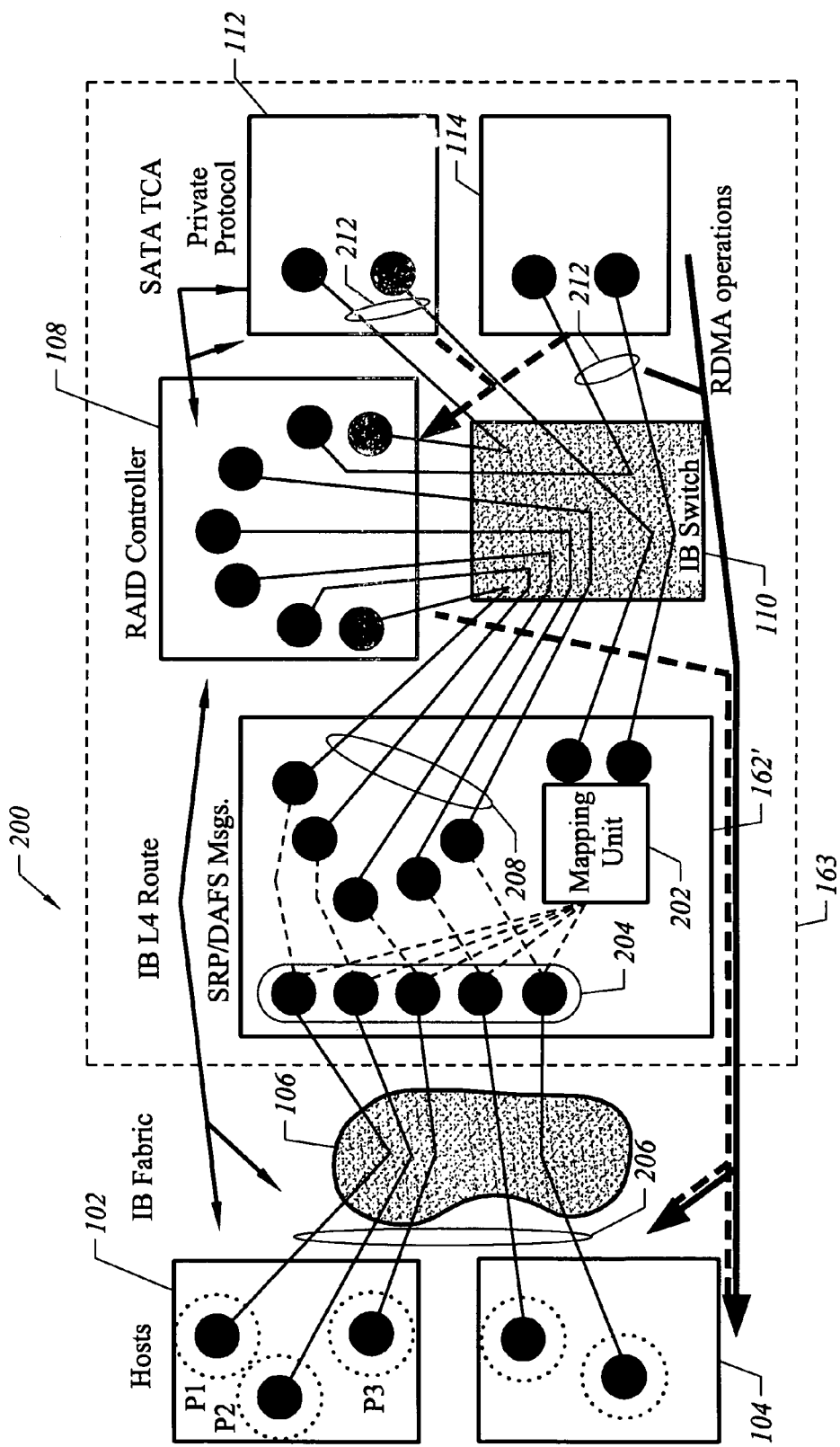
FIG. 4 illustrates an InfiniBand RC internal transport system based approach in accordance with one embodiment of the present invention.
Figure 5:
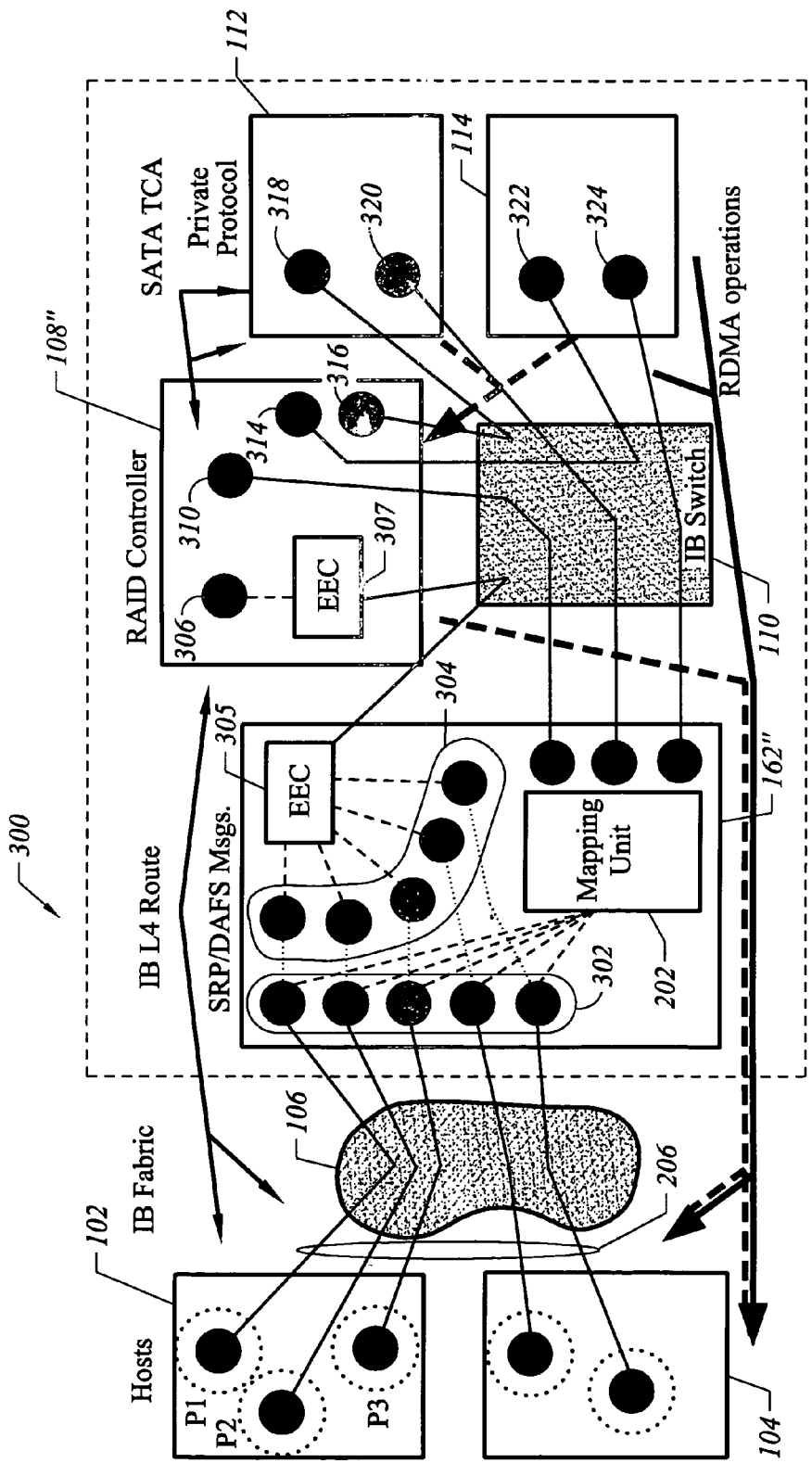
FIG. 5 shows an InfiniBand transport architecture with RD transport between a router and a controller in accordance with one embodiment of the present invention.

FIG. 4 illustrates an InfiniBand RC internal transport system 200 based approach in accordance with one embodiment of the present invention. Another way to avoid the QP explosion that would result from the InfiniBand approach as described in reference to FIG. 2 is to use only RC sessions and devise a method to map RDMA requests to the appropriate hosts. Therefore, the implementation issues of RD service can be completely eliminated if RC service is used to communicate SRP requests and status between the controller 108 and a router 162'. The host processes would then communicate using RC sessions with QPs in the L4 router 162' in the external storage box 163, just as the embodiments described in reference to FIG. 3. However, in a preferable embodiment, another set of RC sessions may be used to communicate between the L4 router 162', the RAID controller 108 and the disk attach TCAs 112 and 114, rather than RD sessions.

The InfiniBand RC internal transport system 200 includes hosts 102 and 104 which are connected to an IB 14 router 162' though the IB fabric 106. The L4 router 162' includes a plurality of QP's 204 (each of the pairs are shown as communicating by a broken line) and a mapping unit 202. As can be seen from FIG. 4, there are four groups of RC sessions: host to L4 router 206, L4 router to controller 208, L4 router to TCA 210, and finally controller to TCA 212. In one embodiment, the L4 router to TCA sessions 210 are only used for TCA to host RDMA traffic which makes it possible for the L4 router to determine the ultimate destinations of arriving packets.

Every host to router RC session has a companion router-controller session. These session pairs are used for all host to controller communication. The router passes arriving SENDs from the host-router sessions to the controller over the companion router-controller session. Similarly, it passes SENDs and RDMA requests arriving from the controller 108 to the companion host-router session for delivery to the appropriate host. Pairing these sessions up avoids the need for any additional addressing in the RC sessions, which is necessary because there aren't any additional addressing fields available.

In this embodiment, the controller 108 parses incoming SRP and DAFS messages, determine what disk accesses are required, and communicate the accesses to the TCAs 112 and 114 through a private protocol. The TCAs instruct their attached disks to perform the operations, and use RDMAs to send or receive data from the hosts 102 and 104. These RDMAs are sent over the router-TCA sessions, where the mapping unit 202 determines which host-router session they are destined for. The mapping unit 202 may be any suitable type of table, database, or information containing structure that may store mapping information which may utilized to enable a proper destination for a received data packet.

In one embodiment, the mapping unit 202 determines the appropriate QP to forward the RDMA request to. As with RC SENDs, the headers do not contain any addressing information that could be directly used to directly route a given request to the correct QP. However, RDMAs include a 64 bit virtual address header, which can be used by the mapping unit 202 to determine the correct destination QP. Therefore, in this embodiment, an additional level of address virtualization is used within the storage box 163. The mapping unit 202 uses the virtual address supplied by an RDMA from a TCA to look up the original host supplied virtual address and appropriate host to router session QP number. The packets for the RDMA are then forwarded to the retrieved QP number, and appropriate additional information is stored to route returning RDMA read packets back to the appropriate router to TCA session.

In another embodiment which routes message SENDs between a host and the controller 108 with RC, the routing of SENDs to the correct router to the controller RC session is done by determining which router QP is the companion of the host to router RC session's QP. The RC QP contains all the rest of the information necessary to find its QP in the controller 108. Similarly, companion session information is all that is required for routing in the reverse direction.

In another embodiment where RC service RDMA requests are routed, the RC service RDMA request headers do not contain any addressing information that could be used to directly route a given TCA to router request to the correct router to host RC session (i.e. QP endpoint). However, RDMAs include a 64 bit virtual address header, which can be used by the mapping unit 202 to determine the correct destination QP. In essence, an additional level of address virtualization is required within the storage box. The mapping unit 202 uses the virtual address supplied by an RDMA from a TCA to look up the original, host supplied virtual address and appropriate host to router session QP number. The packets for the RDMA are then forwarded to the retrieved QP, which then sends them over its RC session to the QP in the host.

FIG. 5 shows an InfiniBand transport architecture 300 with RD transport between a router 162" and a controller 108" in accordance with one embodiment of the present invention. In one embodiment as described herein, RD services between the route 162" and the TCAs 112 and 114 can be replaced by RC services, provided a method of determining the correct routing for RDMA requests is utilized. FIG. 5 indicates the basic communication paths and system components of one embodiment of the InfiniBand transport architecture 300. As with what was described in reference to FIG. 3, processes within host computers communicate with the storage box over InfiniBand RC sessions and RD is used to transport message SENDS between the router and the Controller. However, RDMA between the router 162" and the TCAs 112 and 114 uses RC sessions. Also, RC sessions can be used for controller to TCA transfers, eliminating the need for RD support in the TCAs 112 and 114.

In one exemplary embodiment, hosts 102 and 104 are connected to an IB L4 router 162" through the IB fabric 106. The LB L4 router 162" includes a mapping unit 202 and includes EEC 305 to enable RD communication with a RAID controller 108". The IB L4 router 162" contains plurality of QP's 302 for RC connections between it and the hosts 102 and 104 while having a plurality of QP's 304 for RD connections for communications with the RAID controller 108". The RAID controller 108" includes QP 306 connected to an EEC 307 for RD communications with the EEC 305 that is connected to the plurality of QP 304 within the L4 router 162". The RAID controller 108" also includes a QP 310 that is connected to a QP 312 so the RAID controller 108" may communicate with the mapping unit 202 located within the L4 router 162". The RAID controller 108" also has QP's 314 and 316 that are coupled with QP's 322 and 318 respectively within the TCA's 112 and 114. The TCA's 112 and 114 also include QP's 320 and 324 which may communicate with QP's 326 and 328 respectively of the mapping unit 202 without going through the RAID controller 108". The mapping unit 202 may direct the data from the TCA's 112 and 114 to the appropriate host by determining the appropriate QP of the RC to send the data to.

Determining the destination QPs for message SENDS within the router is the same as for what was described in reference to FIG. 3. In this embodiment, all I/O request SEND messages from hosts 102 and 104 are routed to the RD QP 306 in the controller 108" over the router to controller EEC session. The source QP number of the router's RD QP indicates to the controller 108" which associated RC QP and hence which host RC session originate the request. The I/O status SEND messages from controller to hosts are sent to the associated RD QP for the appropriate host RC session, thus directing them to the correct host.

In another embodiment the use of RD between the controller 108" and the router 162" may be substituted by defining a private encapsulation to supply the extra QP addressing information. This could be accomplished by using an extra header in each SEND message that is stripped off by the router 162". In such an embodiment, the header is used in both directions, as the router 162" supplies the RC QP source number in SEND messages it forwards to the controller on behalf of the hosts 102 and 104 as well. The private routing protocol could also enable one to define special commands to allow the controller 108" to update Router mapping tables etc.

The TCA to router RC sessions determines which router to host RC sessions to map their RDMA writes and read requests to, using the mapping unit 202. Typically, the RC headers do not contain any addressing information that could be used to directly route a given request to the correct QP. However, RDMAs include a 64 bit virtual address header, which can be used by a mapping unit to determine the correct destination QP. In essence, an additional level of address virtualization may be used within the storage box. The mapping unit 202 uses the virtual address supplied by an RDMA from a TCA to look up the original, host supplied virtual address and appropriate Host to Router session QP number. The packets for the RDMA are then forwarded to the retrieved QP number, and appropriate additional information is stored to route returning RDMA read packets back to the appropriate Router to TCA session.

Controller initiated RDMA requests may use the RD service between the controller 108" and the router 162", however they could also use RC and the same mapping hardware as the TCA initiated requests. Using the RC service may improve performance because the RDMA traffic would be over RC sessions all the way, and would provide a consistent mechanism for all bulk data transfers.

For the most part, the operation of the three example SRP requests are similar to that described in reference to FIG. 3. Host to Controller communication may be identical, using the same combination of RC and RD. The actual data transfers may be by RDMA, but this time using RC sessions for the entire path. In the case of a RAID 5 write, the initial disk reads needed for parity generation will use RDMA writes over the controller 108" to TCA RC sessions to place data the controller's cache memory. The Controller's RDMA read requests to the host process is sent via a Controller to Router RC session rather than using RD service. The mapping unit may use the RDMA virtual address to determine which Host to Router RC session to use for the transfer into the controller's cache. Once the appropriate exclusive OR operations are performed, the controller issues disk write operations to the TCAs 112 and 114, again instructing them to fetch the modified data from the controller's cache through RDMA reads over RC sessions. When the writes are finished, the TCAs 112 and 114 notify the controller, which in turn sends an SRP completion and status message to the host process.

In one embodiment, when a write is conducted, the SRP write request results in the controller 108" sending one or more write requests to TCAs, which will inform them to fetch the data for those blocks directly from the host via RDMA through the router 162" to the TCAs 112 and 114. The TCAs 112 and 114 sends RC service RDMA read requests to the mapping unit 202 of the router 162", which then forwards them on the appropriate RC session which connects the controller 108" to one of the hosts 102 and 104 (depending on which host made the write request). As each data packet of the RDMA read response arrives at the router 162", it is forwarded to the RC service QP in the TCA which originated the request, using the saved PSN mapping information in a similar fashion to that used in above as discussed in reference to FIG. 3. After completion of all RDMAs and disk operations, an SRP status message will be sent back to the host.

Disk reads are also processed in essentially the same manner as discussed above in reference to FIG. 3, except for the use of virtual address based mapping at the router 162". In this case it is the RDMA write operation which is routed to the appropriate Host-Controller RC session using the virtual address mapping units.

The approach as described by FIG. 5 utilizes RC sessions for all RDMA transfers, with routing based on virtual address mapping techniques. It also uses RC sessions to communicate disk commands to the TCAs. However, this approach still uses RD services to communicate SRP messages between the Router and the Controller.

Figure 6:
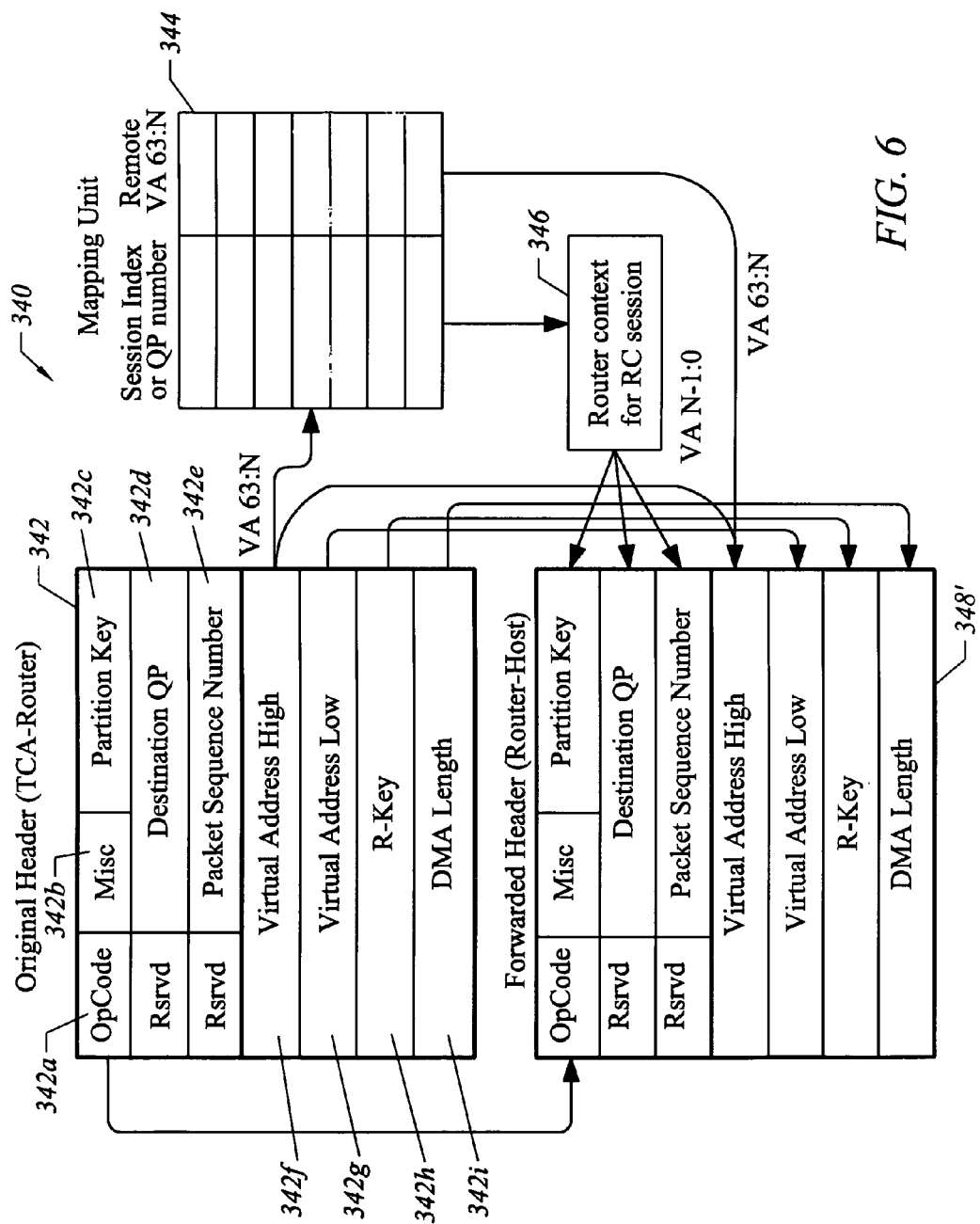
FIG. 6 illustrates an RDMA request mapping table in accordance with one embodiment of the present invention.

FIG. 6 illustrates an RDMA request mapping table in accordance with one embodiment of the present invention. An original InfiniBand header 342 sent from a TCA to a router with data in response to a read request includes Opcode 342a, miscellaneous data 342b, partition key 342c, destination QP 342d, packet sequence number 342e, virtual address high 342f, virtual address low 382g, R-key 342h, and DMA length 342i. As indicated in FIG. 5, a forwarded header 348 sent from a router to a host would obtain the OpCode 342a, most of the virtual address 342f and 342g, the R-Key 342h and the DMA Length 342i from the original header 342. The destination QP and the higher order bits of the virtual address of the forwarded header would come from an address mapping table 344 and derived from a router context for RC session 346. The particular entry would be determined by the high order bits of the original virtual address.

The number of entries in the mapping table 344 would determine how many SRP requests could be handled at one time. When the controller received a new SRP request, it would allocate a new page table entry, unless the request could be accommodated by an existing entry. It is quite possible that one request could end up crossing a page boundary and require two entries, or, at least in theory, be so large that it required two or more entries. The entry(ies) would be filled in with the QP number and actual InfiniBand virtual address, and the individual TCAs would be given the local virtual addresses to use for their RDMA requests. An SRP request that was striped across several drives would result in multiple RDMA requests, but not necessarily multiple mapping table entries.

A typical SRP Read transaction would proceed as follows. An SRP read request from a process in the host 112 comes into the router 162 as an RC SEND message. The SEND is forwarded by the router to the companion RC session, and eventually delivered to the RAID controller. The RAID controller interprets the command, determines which TCAs and drives contain the requested blocks, and generates the appropriate disk read commands. It also takes the InfiniBand virtual addresses and maps them to a range of free local virtual addresses. The storage box local virtual to remote virtual translation, and the appropriate QP number are passed to the router 162 by some control message protocol. The local virtual addresses along with the original R-Key and the disk commands are passed to the TCAs 112 and 114. When the TCAs 112 and 114 begin reading in the disk data, they will generate RDMA requests to the router 162, using the local virtual addresses for the remote address, and the host supplied R-Key. When the router 162 receives the initial RDMA packet, it uses the storage box local virtual address to look up the stored remote virtual address and router QP number. It could also have its own copy of the R-Key to compare against the supplied R-Key as an extra RDMA validation step. The router 162 switches at the message level, so once the FIRST packet of a multi-packet RDMA write is sent to the outbound QP, a connection will be established that will persist until the LAST packet is received. The outbound QP will queue, delay or reject any other SENDs or RDMA requests until the current request is finished, since messages cannot be interleaved on a given RC session. More details of how all this could be accomplished will be given in the Router detail section.

Figure 7:
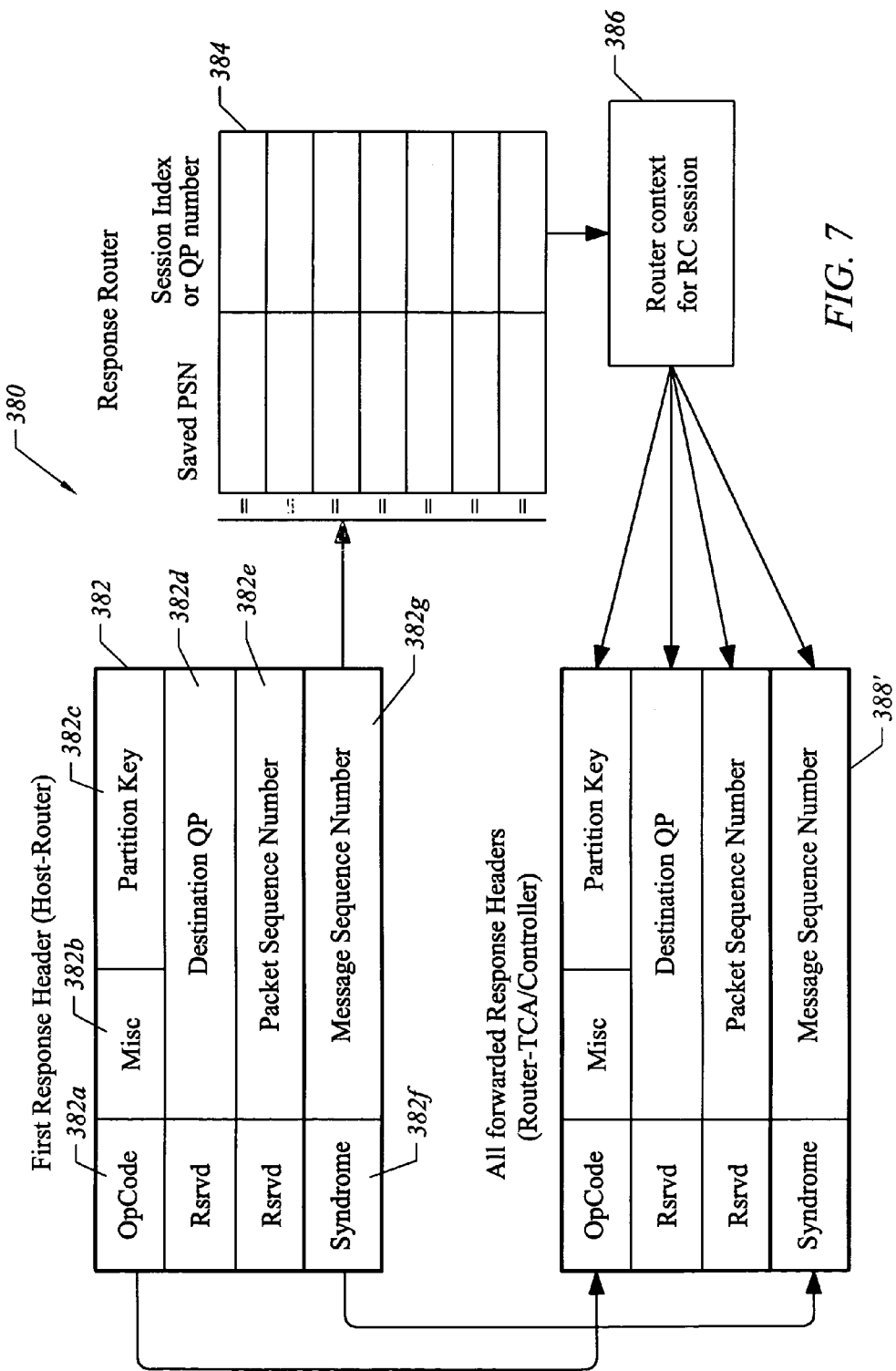
FIG. 7 shows an RDMA response mapping table in accordance with one embodiment of the present invention.

FIG. 7 shows an RDMA response mapping table in accordance with one embodiment of the present invention. In one embodiment, the response mapping table is utilized when a disk write data is sent from the host 102 to the TCAs 112 and 114 through the router 162. A first response header 302 includes OpCode data 302a, Misc data 302b, partition key data 302c, destination QP data 302d, packet sequence number data 302e, syndrome data 302f, and message sequence number data 302g. In one embodiment, the Opcode data 302a and the syndrome data 302f from the first response header 302 is included in the forwarded response header 308.

A disk write request results in one or more RDMA read(s) which have response data that needs to be routed to the correct Router-TCA session. As shown in FIG. 6, the only information available to direct the returning response packets is the Packet Sequence Number of the first packet. These PSNs could be stored in a Content Addressable Memory (CAM) or hash table for lookup by the Router when the RDMA read response data arrives. Once a PSN match was found, the corresponding QP number of the router 162 to TCA RC session would be retrieved and used for all packets of the response.

Thus, a disk write would proceed similarly to a disk read, with the SRP write message forwarded to the controller 108, which would then inform one or more TCA(s) to initiate disk writes. The TCA(s) would send RDMA reads to the host making the disk write request to acquire the data. The RDMA read requests would be mapped according to the high order virtual addresses as done for RDMA writes, and would be forwarded on to the host. At the same time, the Router would record the PSN of the first expected response packet in a table for that QP (or a hash of the PSN and QP number if a common table is used) along with the QP number of the session on which the request arrived from the TCA. Later on, when the FIRST or ONLY packet of the response arrives, the PSN and host-router session QP number would be used to retrieve the router-TCA session QP number, and that packet, plus any additional packets in the response, would be forwarded to that QP and hence to the originating TCA. When all TCA(s) had received their data and written it to disk, the controller would generate an SRP status message, the same as for a disk read operation.

Figure 8:
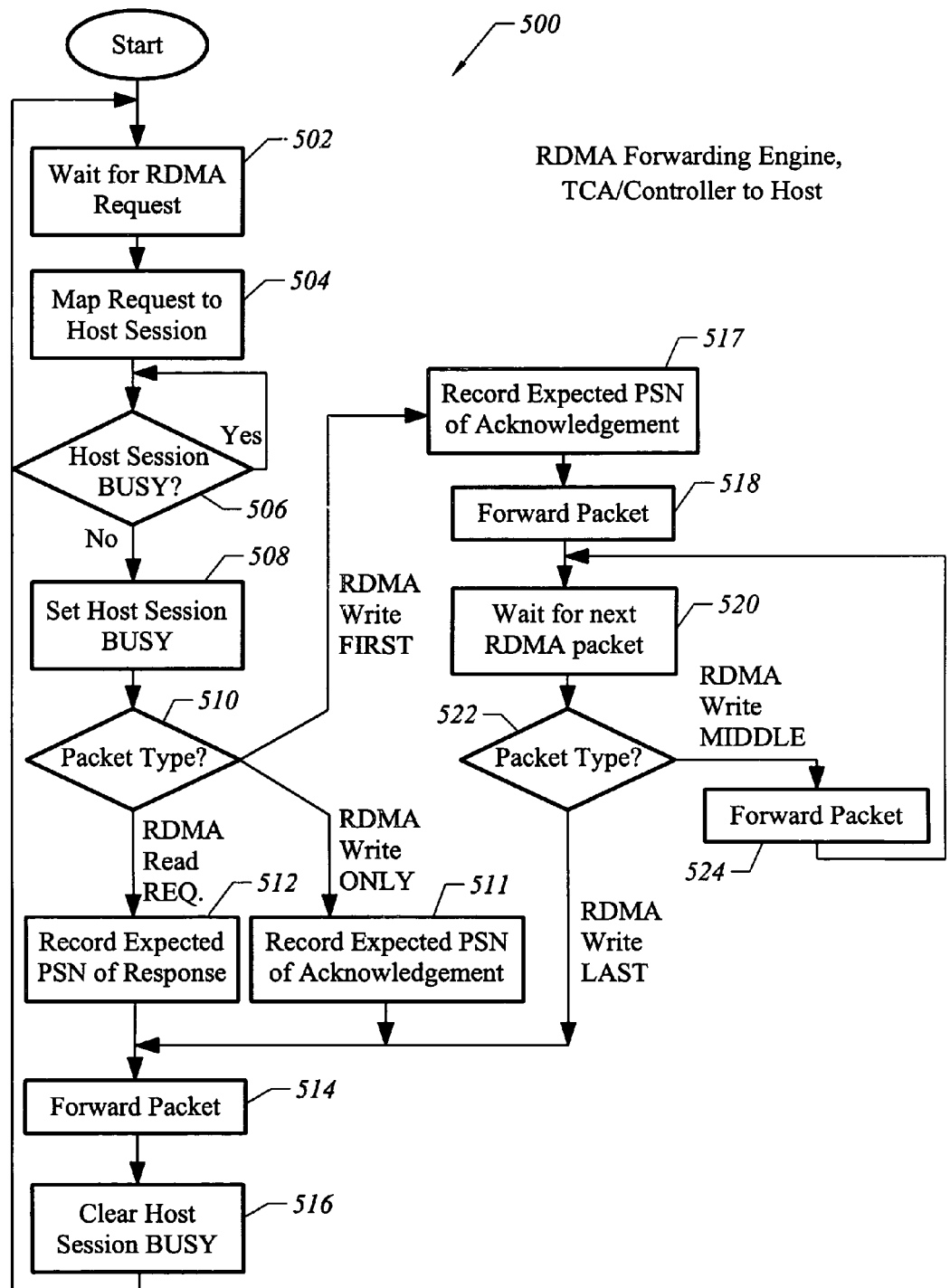
FIG. 8 defines a flowchart that illustrates the methodology to forward packets from a TCA-Router session to a Host-Router session in accordance with one embodiment of the present invention.

FIG. 8 defines a flowchart 500 that illustrates the methodology to forward packets from a TCA-Router session to a Host-Router session in accordance with one embodiment of the present invention. Messages (SENDs) and RDMA requests arriving from the hosts do not have addressing information beyond the router destination QP. The router must have a pre-defined final destination for these requests and their associated packets. Fortunately, messages from the hosts are high level SRP or DAFS requests which must be sent to the RAID/file system controller and are never sent to the individual TCAs, resulting in a trivial routing function. That is, SENDs arriving from any host are routed to a pre-defined destination QP which is on the controller's InfiniBand channel adapter. In addition, the hosts do not do RDMA accesses with either storage protocol, so any arriving RDMA requests would also go to the controller, and be treated as higher level protocol errors.

In one embodiment, the router can use cut through routing in many cases, resulting in a very minimal latency. However, intermixing packets are avoided from two SENDs or RDMA writes that are destined to the same Host-Controller session. Essentially, the router acts as a message switch, rather than a packet switch. Since InfiniBand tags individual SENDs and RDMA data packets with ordering information, the extent of an individual message may be determined. A new SEND or RDMA write would arrive with a packet labeled "FIRST" or "ONLY". If "FIRST", then the router would maintain the path until a corresponding "LAST" packet was seen. If an "ONLY" packet was seen, then the message is only one packet long anyway, so there is no issue.

In one embodiment, the method begins with operation 502 which waits for an RDMA request. After operation 502, the method moves to operation 504 which maps the request to a host session. Then operation 506 determines whether the host session is busy. If the host session is busy, operation 506 is repeated. If the host session is not busy then the method moves to operation 508 which sets the host session as being busy. After operation 508, the method moves to operation 510 which determines a packet type. If the packet type is an RDMA Write FIRST then the method moves to operation 517. If the packet type is RDMA Write ONLY then the method moves to operation 511 which records expected PSN of Acknowledgement. If the packet type is RDMA Read REQUEST then the method moves to operation 512 which records expected packet sequence number of response.

Operation 517 records expected PSN of Acknowledgement. After operation 517, the method moves to operation 518 which forwards a packet. After operation 518, the method moves to operation 520 waits for next RDMA packet. After operation 520, the method proceeds to operation 522 which determines the packet type. If the packet type as determined by the operation 520 is RDMA Write MIDDLE then the method moves to operation 524 which forwards the packet and returns to operation 520. If the packet type as determined by operation 520 is a RDMA Write LAST packet then the method moves to operation 514. After one of operations 511, 512, and 522, the method moves operation 514 which forwards the packet. Then operation 516 clears the host session busy and returns to operation 502.

Therefore, after a packet for a new RDMA request arrives it is determine which host it is for. If the method as described in FIG. 3 is used, the routing is implicitly the affiliated QP of the RD QP within the router to which the RDMA request was directed. If the method as described in FIG. 4 is used, then the high order VA bits are used to index into a mapping table which contains the QP number of the Host-Router session to use. Once the correct Host-Router session is determined, it is locked for exclusive access by the RDMA request, assuming it is not already locked by another RDMA request. FIG. 8 indicates sequentially testing and setting a BUSY flag, but in practice this may be performed atomically to avoid race conditions, and can be completely in hardware.

In one embodiment, RDMA read requests are single packets, which are forwarded on to the host after recording any information required to route the RDMA read Response packets back to the TCA. In one example of a RDMA packet configuration, the RDMA write packets may have the ONLY OpCode, the packets are simply forwarded on, since no additional packets will follow. For both the RDMA read requests and RDMA write ONLY packets, the host session can be unlocked as soon as the packet is sent.

In another example, an initial RDMA packet may be a FIRST packet of an RDMA write, indicating that more packets will follow. Since multi-packet RDMA transfers are not interleaved within a session, the state machine can latch the QP mapping information and then dedicate itself to transferring the remaining packets of the RDMA write.

In a further example, when the RDMA write LAST packet is encountered, it is forwarded, the host session is unlocked, and the state machine again waits for a new RDMA request.

Figure 9:
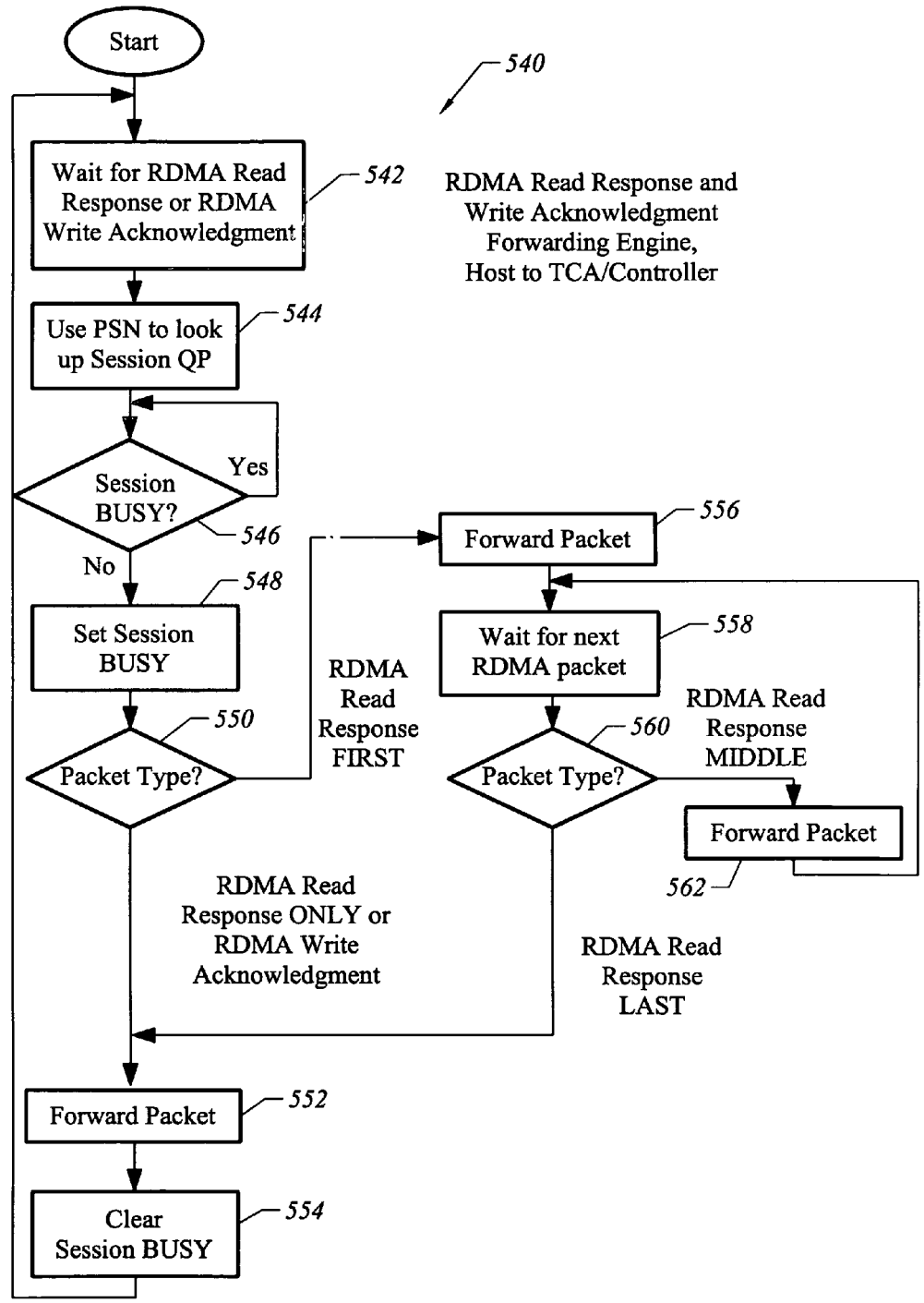
FIG. 9 illustrates a flowchart that shows a method for forwarding packets from a host to a TCA/Controller in accordance with one embodiment of the present invention.

FIG. 9 illustrates a flowchart 540 defining an operation of an RDMA response routing state machine where RDMA response packets are forwarded packets from a host to a TCA/Controller in accordance with one embodiment of the present invention.

In one embodiment, the flowchart 540 illustrates the operations needed to forward packets from a TCA-Router session to a Host-Router session.

In this embodiment, the method begins with operation 542 which waits for RDMA response or RDMA Write Acknowledgment. After operation 542, the method moves to operation 544 which uses PSN to look up session QP. Then operation 546 determines whether the session is busy. If the session is busy, operation 546 is repeated. If the session is not busy then the method moves to operation 548 which sets the session as being busy. After operation 548, the method moves operation 550 which determines a packet type. If the packet type is RDMA Response ONLY or RDMA Write Acknowledgement, then the method advances to operation 552 which forwards the packet. If the packet type is RDMA Response FIRST then the method moves to operation 556 which forwards the packet. After operation 556, the method moves to operation 558 which waits for next RDMA packet. After operation 558, the method moves to operation 560 which determines the packet type is an RDMA Response MIDDLE or RDMA Response LAST. If the packet type is RDMA Response MIDDLE, the method moves to operation 562 which forwards the packet. After operation 562, operations 558 and 560 are repeated. If the packet type as determined by operation 560 is RDMA Response LAST, the method moves to operation 552. After operation 552, the method proceeds to operation 554 which clears the host session BUSY message and returns to operation 542.

Therefore, FIG. 9 illustrates the operation of a RDMA response routing state machine. Conceptually there would be one of these for each Host-Router session QP supported by the router. When the QP received the FIRST or ONLY packet of an RDMA read response, the appropriate TCA-Router session's QP would be determined, and the session would be atomically locked. If the packet was a RDMA response ONLY packet, it would be forwarded, and then the lock would be released. Otherwise, the packet would be an RDMA response FIRST packet, and the session would remain locked while additional packets of the response were forwarded. When the RDMA response LAST packet arrived, it would be forwarded and then the session again unlocked.

Figure 10:
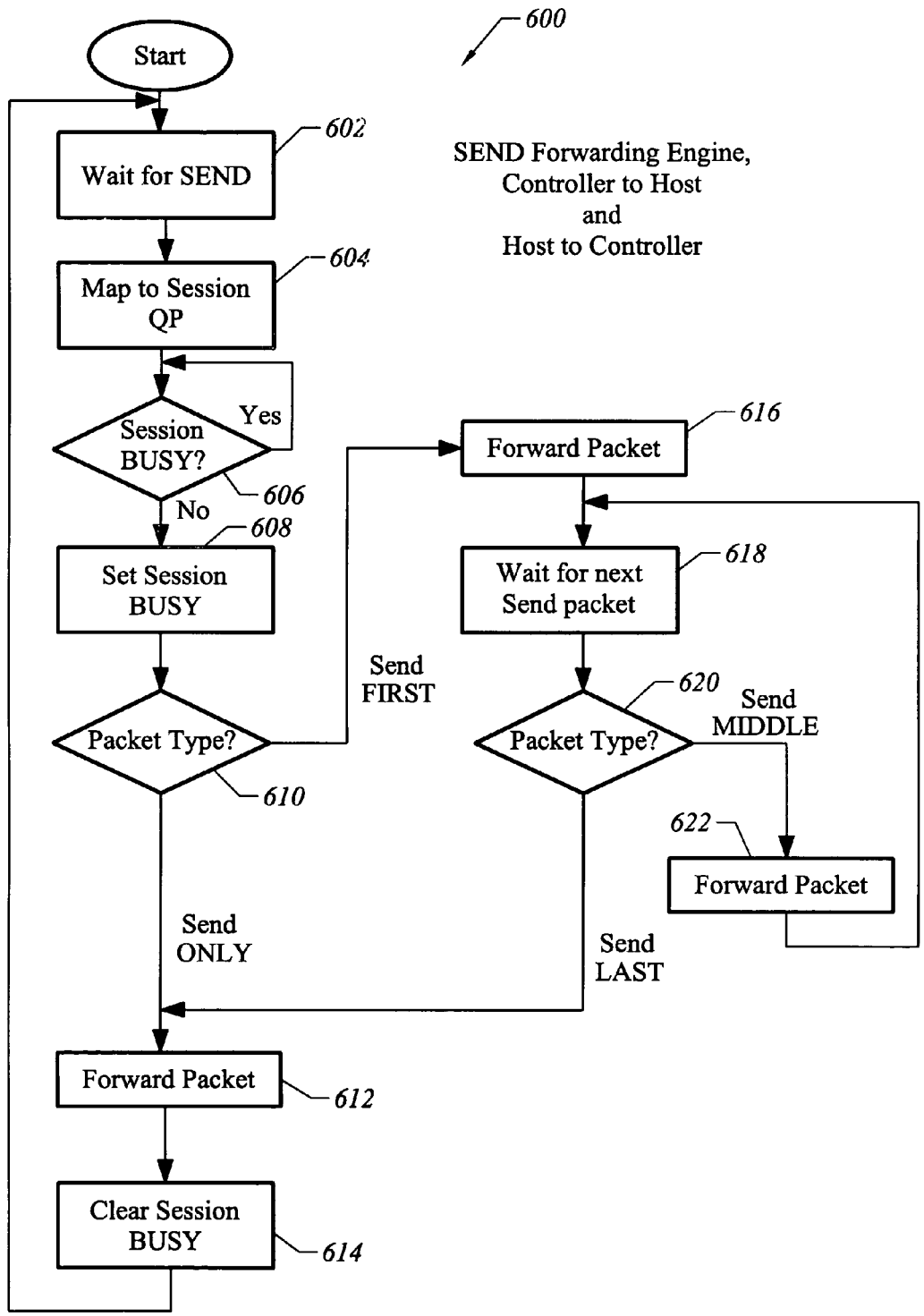
FIG. 10 shows a flowchart where message forwarding through the router is defined in accordance with one embodiment of the present invention.

FIG. 10 shows a flowchart 600 where message forwarding through the router is defined in accordance with one embodiment of the present invention. In one embodiment, the method begins with operation 602 which waits for a SEND packet. After operation 604, the method moves to operation 606 which determines if the session is busy. If the session is busy, the method returns to operation 604. If the session is not busy, the method moves to operation 608 which sets the session to BUSY. Then the method moves to operation 610 which determines packet type. If the packet type is SEND FIRST then the method moves to operation 616 which forwards packet. After operation 616, the method moves to operation 618 which waits for next SEND packet. After operation 618, the method proceeds to operation 620 which determines the packet type. If the packet type as determined by operation 620 is a SEND MIDDLE packet then the method advances to operation 622 which forwards the packet and repeats operation 618 and 620. If the packet type as determined by operation 620 is a SEND LAST packet then the method moves to operation 612 which forwards the packet. If operation 610 determined that the packet type is a SEND ONLY packet then the method moves to operation 612. After operation 612, the method proceeds to operation 614 which clears the session busy. Then the method moves back to operation 602.

As indicated below, routing of SEND messages operates very similarly to RDMA requests and responses, except for how the actual QP is determined. Otherwise, there is the same need to lock the outgoing session, and handle multiple packet messages. The exact routing method is specific to each architectural approach.

In the event that another RDMA request arrives from a different TCA or a message from the Controller while a current RDMA write is in progress, the router will have to delay the new RDMA request or message until the current one is finished. The packets from the new request could be held in local router buffers, if available. Alternatively, if the TCA-Router path is an RC session, then the request could just be delayed by withholding acknowledgements. But if the TCA-Router path is done with RD and no buffer space is available, the companion RD QP will have to return an RNR NAK.

Figure 11:
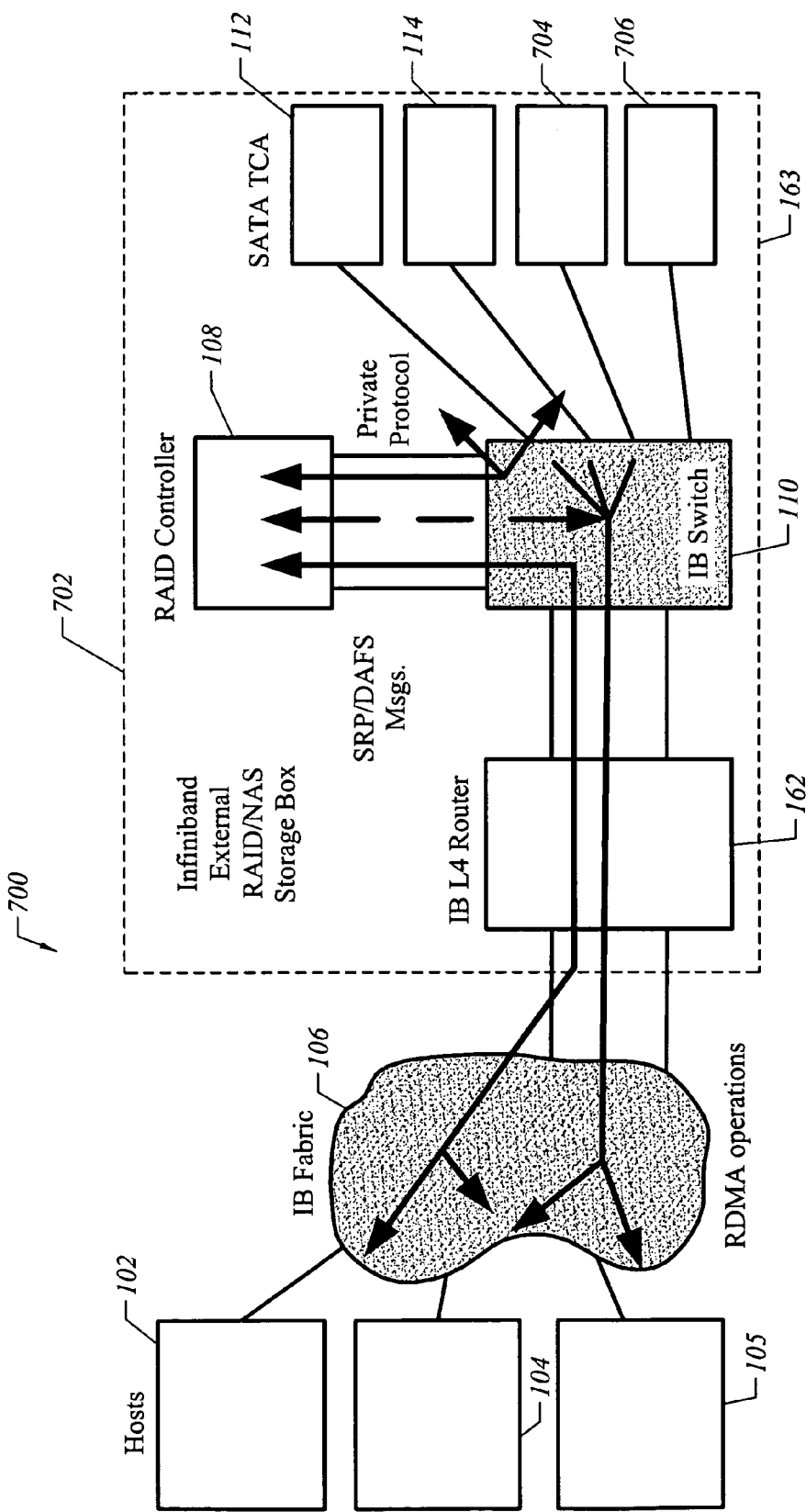
FIG. 11 shows an architecture of an InfiniBand system with external storage controller in accordance with one embodiment of the present invention.

FIG. 11 shows an architecture 700 of an InfiniBand system in accordance with one embodiment of the present invention. In one embodiment, hosts 102, 104, and 105 are connected to the L4 router 162 within the storage box 163 through the IB fabric 106. The storage box therefore includes the router 162 which is connected to the RAID controller 108 through an internal IB switch 110. The RAID controller as well as the L4 router 162 may communicated with TCA's 112, 114, 704, and 706.

While the various diagrams describing the different approaches would appear to require several specialized groups of QPs, the flexibility and applicability of the L4 router could be enhanced by equipping all QPs with the ability to do forward and reverse mapping of RDMA traffic and ability to be coupled to a companion QP. This would enable forwarding of RDMA traffic in both directions, and more flexibility in how message traffic is forwarded. If RD support is added as well, then actually any of the approaches can be implemented for the external storage box 163.

In one embodiment the L4 router 162 may have a chip with four ports, two "internal" and two "external". It should be appreciated that the chip may have any suitable number and types of ports depending on the application desired. Two external ports may be utilized so that they could be connected to different switches and provide fail-over as well as load balancing. However, since the four ports would have identical functionality, other configurations or applications would be possible.

Using a dedicated SATA to IB TCA chip rather than a generic PCI-IB chip and a PCI-SATA (or PCI-SCSI) chip can enhance the architecture 700. In particular, since SATA has a dedicated serial link to each drive, drives can be held off through link flow control if the TCA does not have the resources necessary to complete a transfer at a particular time. With SCSI, a host initiated disconnect would be used, which may not be supported by the drive, and even if it is, will not immediately stop data transfer. It may be even harder to do if an intermediate PCI bus is involved, and that compounds the problem of using a parallel SCSI interface to the disk drive. So, usage of an SATA-IB TCA chip may enhance the functionality of the architecture 700 as well as the other architectures described herein.

To achieve the lowest possible latencies, a design may be utilized which uses cut-through routing. So, disk reads may have to fill a whole packet (or terminate) before the packet can be sent off on the IB Fabric. Additionally, once an RDMA request starts on a given connection it must finish before another can begin. This implies that either requests are handled one request at a time, or several QP sessions occurs off the chip, each one dedicated to a particular RDMA read or write at a given time. For example, four data QPs may be used, and can be assigned to pending disk requests as the requests reach the data transfer phase. If more than four requests (because, for example, 8 SATA drives are attached) complete at before the first is finished, the last to complete will be held off with SATA flow control until a QP is freed up from an earlier request. The exact number may be any suitable number that would enhance resources and performance. In addition, disk writes (RDMA reads) can still be cut through, as the data is arriving at a faster, and predictable rate over the IB wire, at least on a per packet basis.

Although the foregoing invention has been described in some detail for purposes of clarity of understanding, it will be apparent that certain changes and modifications may also be practiced. Accordingly, the present embodiments are to be considered as illustrative and not restrictive, and the invention is not to be limited to the details given herein.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. An Infiniband network architecture, comprising:
   router circuitry configured to communicate data between an external host and an internal target device, the router circuitry configured to generate,
      an external queue pair (QP) for establishing communication between the router circuitry and the external host through a reliable connection (RC) session,
      internal queue pairs, one of the internal queue pairs being coupled with the external queue pair, the internal queue pairs establishing communications between a device controller and the internal target device, between the router circuitry and the device controller, and between the router circuitry and the internal target device by using reliable datagram (RD) sessions, and
      a router end-to-end context for enabling the internal queue pairs to communicate with at least one controller end-to-end context and at least one target device end-to-end context.

2. An Infiniband network architecture as recited in claim 1, wherein the router circuitry is capable of communicating with the device controller using remote direct memory access.

3. An Infiniband network architecture as recited in claim 1, wherein the device controller is a RAID controller.

4. An Infiniband network architecture as recited in claim 1, wherein the target device is a storage device.

5. An Infiniband network architecture as recited in claim 1, wherein router circuitry may be embodied on a semiconductor chip.

6. An Infiniband network architecture as recited in claim 1, wherein a source QP number of an internal QP indicates to the device controller which associated external QP and which host session originated a request message when the host sends a request message to the target device.

7. An Infiniband network architecture as recited in claim 6, wherein the source QP number facilitates remote direct memory access (RDMA) communications between the target device and the host.

8. An Infiniband network architecture as recited in claim 1, wherein the router facilitates remote direct memory access (RDMA) communications between the host and the target device while bypassing the device controller.

9. An Infiniband network architecture, comprising:
   router circuitry configured to communicate data between an external host and a target device, the router circuitry including,
      circuitry for generating an external queue pair (QP) for establishing communication between the router circuitry and the external host through a reliable connection (RC) session,
      circuitry for generating internal queue pairs, a first set of the internal queue pairs establishing communication between the router circuitry and an internal device controller by using reliable datagram (RD) sessions, a second set of internal queue pairs establishing communications between the router circuitry and the target device by using reliable connection (RC) sessions,
      circuitry for generating a router end-to-end context for enabling the internal queue pairs to communicate with at least one controller end-to-end context, and
   a mapping unit capable of establishing data destinations in communications between the target and the host, such that one of the second set of internal queue pairs are coupled with the external queue pair through the mapping unit.

10. An Infiniband network architecture as recited in claim 9, wherein the data destinations as determined by the mapping unit facilitates remote direct memory access (RDMA) communications between the host and the target while bypassing the device controller.

11. An Infiniband network architecture as recited in claim 9, wherein the router circuitry is capable of communicating with the device controller using RDMA.

12. An Infiniband network architecture as recited in claim 9, wherein the device controller is a RAID controller.

13. An Infiniband network architecture as recited in claim 9, wherein the target device is a storage device.

14. An Infiniband network architecture as recited in claim 9, wherein the router circuitry is embodied on a semiconductor chip.

15. An Infiniband network architecture as recited in claim 9, wherein the device controller is capable of writing a source QP number and a mapping relationship of the Infiniband virtual address with the local virtual address into the mapping unit.

16. An Infiniband network architecture as recited in claim 9, wherein a source QP number and an Infiniband virtual address mapped to a local virtual address within the mapping unit indicates an external QP from which a request message originated.

17. An Infiniband network architecture as recited in claim 16, wherein the device controller is capable of supplying the local virtual address to a target control adapter (TCA) so the TCA can include the local virtual address in an RDMA communication to the host.

18. An Infiniband network architecture as recited in claim 17, wherein the router circuitry uses the mapping unit by associating the local virtual address with the Infiniband virtual address to determine a destination of the RDMA communication.

19. An Infiniband network architecture, comprising:
router circuitry configured to communicate data between an external host and a target device, the router circuitry including,
circuitry for generating an external queue pair (QP) for establishing communication between the router circuitry and the external host through a reliable connection (RC) session, and
circuitry for generating internal queue pairs, the internal queue pairs establishing communication between the router circuitry and an internal device controller, between the device controller and the target device, and between the router circuitry and the target device by using reliable connection (RC) sessions, and
mapping circuitry capable of establishing data destinations in communications between the target and the host,
wherein one of the internal queue pairs are coupled with the external queue pair through the mapping circuitry.

20. An Infiniband network architecture as recited in claim 19, wherein the router circuitry is capable of communicating with the device controller using RDMA.

21. An Infiniband network architecture as recited in claim 19, wherein the device controller is a RAID controller.

22. An Infiniband network architecture as recited in claim 19, wherein the target device is a storage device.

23. An Infiniband network architecture as recited in claim 19, wherein the router circuit is embodied on a semiconductor chip.

24. An Infiniband network architecture as recited in claim 19, wherein the router circuitry is capable of communicating with the device controller using remote direct memory access (RDMA).

25. An Infiniband network architecture as recited in claim 19, wherein the device controller is capable of writing a source QP number and a mapping relationship of the Infiniband virtual address with the local virtual address into the mapping circuitry.

26. An Infiniband network architecture as recited in claim 19, wherein a source QP number and an Infiniband virtual address mapped to a local virtual address within the mapping circuitry indicates an external QP from which a request message originated.

27. An Infiniband network architecture as recited in claim 26, wherein the device controller is capable of supplying the local virtual address to a target control adapter (TCA) so the TCA can include the local virtual address in an RDMA communication to the host.

28. An Infiniband network architecture as recited in claim 27, wherein the router circuitry uses the mapping table by associating the local virtual address with the Infiniband virtual address to determine a destination of the RDMA communication.

29. An Infiniband network architecture, comprising:
router circuitry configured to communicate data between an external host and a target device, the router circuitry including,
circuitry for generating an external queue pair (QP) for establishing communication between the router circuitry and the host through a reliable connection (RC) session,
circuitry for generating internal queue pairs, one of the internal queue pairs being coupled with the external queue pair, the internal queue pairs establishing communications between an internal device controller and the target device, between the router circuitry and the device controller, and between the router circuitry and the target device by using reliable datagram (RD) sessions, and
circuitry for generating a router end-to-end context for enabling the internal queue pairs to communicate with at least one controller end-to-end context and at least one target device end-to-end context.

30. An Infiniband network architecture as recited in claim 29, wherein the router circuitry is capable of communicating with the device controller using remote direct memory access.

31. An Infiniband network architecture as recited in claim 29, wherein the device controller is a RAID controller.

32. An Infiniband network architecture as recited in claim 29, wherein the target device is a storage device.

33. An Infiniband network architecture as recited in claim 29, wherein the router circuitry uses information at the transport layer to route data between transport sessions.

34. A non-transitory computer readable medium having program instructions for implementing data transmission over an Infiniband network architecture where a router communicates data between an external host and a target, the non-transitory computer readable medium comprising:
program instructions for generating an external queue pair (QP) for establishing communication between the router and the external host through a reliable connection (RC) session,
program instructions for generating internal queue pairs, a first set of the internal queue pairs establishing communication between the router and an internal device controller by using reliable datagram (RD) sessions, a second set of internal queue pairs establishing communications between the router and the target device by using reliable connection (RC) sessions,
program instructions for generating a router end-to-end context for enabling the internal queue pairs to communicate with at least one controller end-to-end context, and
program instructions for mapping data destinations for communication between the target and the host, such that one of the second set of internal queue pairs is coupled with the external queue pair through the mapping unit.

35. A non-transitory computer readable media as recited in claim 33, wherein the device controller is a RAID controller.

36. A non-transitory computer readable media as recited in claim 33, wherein the target device is a storage device.

37. A non-transitory computer readable media as recited in claim 33, wherein the router uses information at the transport layer to route data between transport sessions.

38. A non-transitory computer readable medium having program instructions for implementing data transmission over an Infiniband network architecture where a router communicates data between an external host and a target, the non-transitory computer readable medium comprising:
program instructions for generating an external queue pair (QP) for establishing communication between the router and the external host through a reliable connection (RC) session,
program instructions for generating internal queue pairs, one of the internal queue pairs being coupled with the external queue pair, the internal queue pairs establishing communications between an internal device controller and the target device, between the router and the device controller, and between the router and the target device by using reliable datagram (RD) sessions, and program instructions for generating a router end-to-end context for enabling the internal queue pairs to communication with at least one controller end-to-end context and at least one target device end-to-end context.

39. A non-transitory computer readable media as recited in claim 32, wherein the device controller is a RAID controller.

40. A non-transitory computer readable media as recited in claim 38, wherein the target device is a storage device.

41. A non-transitory computer readable media as recited in claim 38, wherein the router uses information at the transport layer to route data between transport sessions.

* * * * *